United States Patent [19]

Monta et al.

[11] 4,319,959
[45] Mar. 16, 1982

[54] METHOD OF SUPERVISING THE CHANNEL STABILITY IN REACTOR CORES OF NUCLEAR REACTORS

[75] Inventors: Kazuo Monta, Yokohama; Yukio Takigawa, Kawasaki, both of Japan

[73] Assignee: Tokyo Shibaura Denki Kabushiki Kaisha, Kanagawa, Japan

[21] Appl. No.: 142,688

[22] Filed: Apr. 22, 1980

Related U.S. Application Data

[63] Continuation of Ser. No. 862,495, Dec. 20, 1977, abandoned.

[51] Int. Cl.³ .................................................. G21C 7/00
[52] U.S. Cl. .................................... 376/245; 376/216; 376/246
[58] Field of Search .................. 176/19 R, 20 R, 22, 176/23, 24, 25; 364/504

[56] References Cited

U.S. PATENT DOCUMENTS 4,080,251  3/1978  Musick ................................. 176/24

FOREIGN PATENT DOCUMENTS 52-139897  11/1977  Japan .................................... 176/24

OTHER PUBLICATIONS

Thie, Joseph A., "Core Motion Monitoring", Nuclear Technology, vol. 45, Aug. 1979.
Carew, J. F., "Process Computer Performance Evaluation Accuracy", Ge. E. 58/730/FD & SA, WCC/6-74.
Laney, Sr., et al., "The Thermal Hydraulics of a Boiling Water Nuclear Reactor", ANS 1977.
Jones, A. B, "Hydrodynamic Stability of a Boiling Channel", KAPL-2170, Oct. 2, 1961.
Ishii, Mamoru, "Thermally Induced Flow Instabilities in Two Phase Mixtures in Thermal Equilibrium", Georgia Inst. of Tech., Phd., 1971–Univ. Microfilms 71-28,095.
Saha, et al., "An Experimental Investigation of the Thermally Induced Flow Oscillations in Two-Phase Systems", ASME, Jul. 25, 1975.

*Primary Examiner*—Donald P. Walsh
*Attorney, Agent, or Firm*—Stevens, Davis, Miller & Mosher

[57] ABSTRACT

In supervising the channel stability of a nuclear reactor, the thermal power and the coolant flow quantity in each fuel assembly are determined by signals produced by a plurality of neutron flux detectors installed in the nuclear reactor, and signals regarding other operating conditions of the reactor, and the thermo-hydrodynamic stability of each fuel assembly is judged by the above-mentioned thermal power and coolant flow quantity as well as the measured values of such parameters as inlet subcooling of the core and of the pressure in the reactor vessel. Or the stability limit of a selected one of the parameters is determined. Then, the threshold of the thermo-hydrodynamic stability or the stability limit is compared with the actually measured value thereof so as to determine a stability margin.

7 Claims, 5 Drawing Figures

METHOD OF SUPERVISING THE CHANNEL STABILITY IN REACTOR CORES OF NUCLEAR REACTORS

This is a continuation of application Ser. No. 862,495 filed Dec. 20, 1977, now abandoned.

BACKGROUND OF THE INVENTION

This invention relates to a method of supervizing the degree of thermo-hydrodynamic stability of the coolant flow in the fuel channels of the reactor core of a nuclear reactor of the type in which boiling of the coolant is permitted in the reactor core, for example a boiling water type nuclear reactor, and more particularly to a method of supervizing the stability of the coolant flow in the fuel assemblies by determining the coolant flow quantity in each fuel assembly which is an important factor for determining a stability limit by signals produced by neutron flux detectors installed in the reactor core.

The coolant passing through the fuel channels each consisting of a fuel rod bundle enclosed by a channel box in the reactor core of a boiling water type nuclear reactor removes the heat generated in the fuel bundle while flowing through the fuel assemblies in the form of a two-phase flow of water and steam. As is well known in the art there is a tendency of hydrodynamic oscillation of the two-phase flow caused by feedback between voides, pressure loss and flow quantities i.e. density wave oscillation. For examle, R. T. Lahey, Jr. and F. J. Moody explain the classification of dynamic instabilities of interest in boiling water type nuclear reactors as density wave oscillations, pressure drop oscillations and flow regime induced instability in their book, "The Thermal Hydraustatic of a Boiling Water Nuclear Reactor", published by the American Nuclear Society, 1977. However, from the point of view of the reactor designer, the most important dynamic instability that must be considered is the density wave oscillation, so that hereinafter, we will consider it. Since the reactor core is provided with a plurality of fuel assemblies which form parallel flow passages, hydrodynamic oscillation is created in each fuel assembly independently of other fuel assemblies under a condition wherein the pressure difference between its inlet and outlet ports is constant. Furthermore, in view of local nature of the oscillation, it can be considered that the feedback through reactor kinetics is not significant so that such feedback can be ignored in the first approximation. Such oscillation mode is termed "channel stability" whereas an oscillation mode wherein the reactor kinetics and the dynamic characteristic of the recirculation flow path are related to the feedback phenomena of the two-phase flow in the fuel assemblies is termed "reactor stability".

The reactor stability during the actual running of a nuclear electric power generating station can, from its definition, be supervised by watching signals regarding the neutron flux in the core, recirculation flow quantity, etc., whereas since the channel stability concerns a local phenomenon it is not always possible to supervise the same by observing only the output of the neutron flux detectors in the core. For this reason, it has been the practice to determine a range of stable operation by carefully analyzing the channel stability at the time of designing the reactor.

The operating conditions of a nuclear electric power generating station may vary during running over an extended period depending upon the type of the fuel, and various limits on the operating conditions. In such a case, the stability is analyzed for modifying the operation range. There are also small changes which do not require such modification. For this reason, it is correct to consider that the limit of the channel stability of a nuclear reactor in actual operation varies from time to time. Since the operating range at the design stage is determined by considering most serious conditions there is considerable allowance of the stability in most cases. Accordingly, the freedom of operation could be greatly increased if the limit of the channel stability under actual operating states were determined by actually measured data in all fuel assemblies.

SUMMARY OF THE INVENTION

Accordingly, it is an object of this invention to provide a novel method of constantly supervising the limit of the channel stability of a boiling water type nuclear reactor during the operation thereof thereby improving safeness and flexibility of operation.

According to one aspect of this invention, there is provided a boiling water reactor wherein a plurality of fuel channels constitute a reactor core and the fuel channels are cooled by a two phase coolant flow which exhibits a density wave oscillation, a method of supervising the stability of said oscillation comprising the steps of determining a thermal power and the coolant flow quantity in each fuel channel by signals produced by a plurality of neutron flux detectors installed in said reactor core, and by signals regarding such operating conditions of said reactor core as inserted positions of control rods, the flow quantity of recirculation water and the thermal power of the core determined by the heat balance of a nuclear power plant, judging the stability of said oscillation of each fuel channel from said thermal power as the coolant flow quantity as well as from measured values of such parameters as inlet subcooling the core and of the pressure in a reactor vessel, or determining a stability limit of a selected one fuel channel from parameters described above or said thermal power or the coolant flow quantity, and comparing said stability limit with a measured value thereof so as to determine a stability margin.

According to another aspect of this invention there is provided a method of supervizing the channel stability in the reactor core of a nuclear reactor of type wherein a plurality of fuel channels through which coolant flows are provided for the reactor core and a plurality of neutron flux detectors are installed along the flow of the coolant, said method comprising the steps of measuring the mutual correlation function of the output signals of the neutron flux detectors so as to determine the propagation time of a disturbance in the coolant flow, determining the flow quantity of the coolant in each fuel channel from the propagation time, judging the thermo-hydrodyanamic stability of each fuel channel by the thermal power and the flow quantity thus determined and by such parameters as the core inlet subcooling and the pressure in the reactor vessel, or determining the stability limit of a selected one of the parameters, and comparing the stability limit with actually measured value thereof so a to determine a stability margin.

DESCRIPTION OF THE PREFERRED EMBODIMENT

Figure 1:
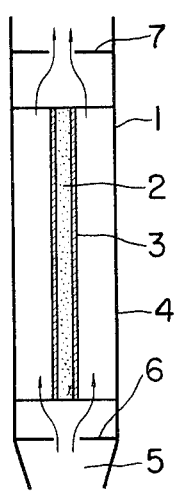
FIG. 1 is a diagrammatic longitudinal sectional view showing a fuel assembly contained in the reactor core of a boiling water type nuclear reactor wherein for the purpose of simplifying the drawing, only one fuel rod is shown.

As diagrammatically shown in FIG. 1, in a boiling water type nuclear reactor, a plurality of fuel rod 2 (for brevity only one of them is shown) are regularly arranged in the form of a grid in a fuel assembly 1 of the reactor core i.e., a fuel bundle. Each fuel rod contains fissionable substance and it is now supposed that it generates a heat quantity of q Kcal/sec. per unit length. This heat quantity is transmitted to the coolant, in this case water, which flows through a fuel channel 4 via a sheath 3 whereby a two-phase flow consisting of water and steam is generated in the fuel channel.

The coolant, or water flows into the fuel assembly 1 from the inlet plenum chamber, not shown, through the inlet opening 5 at the lower end of the fuel assembly. Then, the water flows into the fuel channel 4 through an inlet orifice 6 and forms the two-phase flow of water and steam, which is discharged into the outlet plenum chamber, not shown, through an outer orifice 7. As a plurality of fuel channels 4 are provided for the reactor core, the pressure differential $\Delta p$ between the inlet and outlet plenum chambers is maintained at a definite value for all channels irrespective of some channel flow divergence in a specific fuel channel. From the view point of nuclear characteristics, if an oscillation occurs in a specific channel independently of the other channels, its effect on the stability of the surrounding channels due to nuclear feedback is negligibly small.

The thermo-hydrodynamic oscillation of the two-phase flow in the fuel channels 4 in fuel assemblies 1 under these conditions is just equal to the stability of a heated two-phase flow loop having the pressure differential $\Delta p$ between the inlet and outlet plenum chambers, and there are numerous experimental data regarding thereto.

The limit of the channel stability is determined by such parameters as (1) the thermal power of each fuel channel and its distribution, (2) inlet subcooling, (3) the pressure in the fuel channel, (4) the hydrodynamic characteristic of the fuel channel including the inlet and outlet orifices, and (5) the inlet flow quantity. Accordingly, if it were possible to measure all of the five parameters described above regarding all fuel assemblies in a nuclear reactor under operation, it would be possible to determine the present stability margin in view of the stability limit described above. Considering the flow quantity, a flow quantity $W^*$ that gives the lower stability limit is determined by using all measured parameters other than the flow quantity. When the measured flow quantity is expressed by $W$, a ratio $W/W^*$ gives an evaluation for the stability margin.

According to the prior art method, the power distribution and the flow quantity distribution of each fuel assembly of a boiling water type nuclear reactor have been determined by repeatedly calculating signals produced by neutron flux detectors disposed in the reactor core by taking into consideration the feedback effect between the thermal power, the flow quantity and the void effect. The following reference describes the detail of the prior art method. J. F. Grew "Process Computer Performance Evaluation Accuracy" NEDO-20340, June 1974, General Electric Co. Monta, et al have developed a method of directly determining the flow quantity in the fuel assembly by determining the propagation time of a disturbance along the flow by utilizing the mutual correlation function of the signals produced by a plurality of neutron flux detectors installed in the reactor as disclosed in Japanese Laid Open Patent Specification No. 139897 of 1977.

Figure 2:
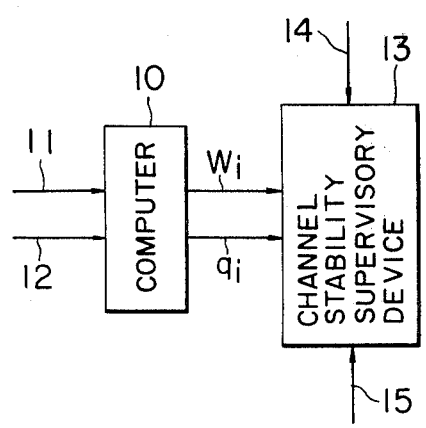
FIG. 2 is a block diagram for explaining the manner of carrying out the method of this invention by using a conventional method of calculating the coolant flow quantity in the reactor fuel assemblies.

FIG. 2 shows one embodiment of this invention based on a prior art method of calculating the flow quantity of the coolant. A computer 10 is connected to calculate the power distribution $q_i$ and the flow quantity distribution $W_i$ of the core by repeating a calculation regarding the relationship among the power distribution in the core, the void distribution, and the flow quantity distribution by using signals 11 produced by all neutron flux detectors in the core, and signals 12, the process variables indicating the inserted positions of control rods, the flow quantity of recirculation water and the thermal power of the core determined by the heat balance of the power plant.

A channel stability supervisory device 13 is connected to receive a signal 14 representing the mean pressure of the channel and a signal 15 representing the subcooling of the recirculation water in addition to the signals representing the power distribution $q_i$ and the flow quantity distribution $W_i$ and functions to determine the channel stability in accordance with an equation to be described latter based on the degree of openings of the inlet and outlet orifices and other predetermined hydrodynamic data, for example two-phase flow friction factor of the fuel assemblies, or to determine the stability margin by comparing a calculated value of the stability limit based on certain designated parameters with the present value thereof.

Figure 3:
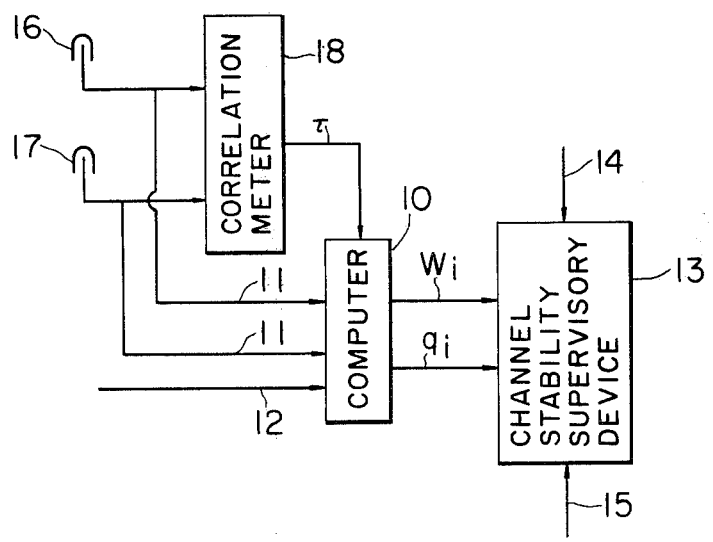
FIG. 3 is a flow diagram for explaining the manner of carrying out the method of this invention wherein the coolant flow quantity is calculated by using a mutual correlation function of the signals produced by two neutron flux detectors installed along the coolant flow.

FIG. 3 shows one embodiment of this invention utilizing the above described method developed by the inventors. In this case, the mutual correlation function of the outputs of two neutron flux detectors 16 and 17 provided along the flow passage of the coolant for the purpose of measuring the flow quantity thereof is determined by a correlation meter 18 so as to obtain the propagation time $\tau$ of the disturbance between the two neutron flux detectors, thereby determining the flow quantity of the coolant in the fuel channels of the fuel assembly adjacent the neutron detectors. The output $\tau$ of the correlation meter 18, the outputs 11 of the neutron flux detectors and the process variables 12 are applied to computer 10. The connection and operation of the channel stability supervisory device 13 is the same as those of the supervisory device shown in FIG. 2.

The detail of the operation of the channel stability supervisory device 13 will now be described. This device provides an information regarding the stability limit of the thermo-hydrodynamic oscillation of the two-phase flow of water and steam in the fuel channels 5 of a boiling water type nuclear reactor and determines the channel stability periodically, or when requested, based on the present state.

The information regarding the stability limit can be given by calculating the stability limit for the power distribution, flow quantity, inlet subcooling and pressure of a fuel channel by using stability analysis codes regarding a boiling water type nuclear reactor which correspond to STABLE, FABLE CODES developed by A. B. Jones, and by giving the calculated value in the form of an approximate function or a table, or can be given by an experimental equation. For example, according to Ishii, the equilibrium phase change number $N_{pck.eg}$ and subcool number $N_{sub}$ are defined respectively by the following equations.

$$N_{pck} \cdot eg = \frac{1}{V_{fi}} \cdot \frac{\Delta \rho}{\rho_g \rho_f} \cdot \frac{g_w \xi h}{A_c \Delta_{ifg}} \quad (1)$$

$$N_{sub} = \frac{\Delta \rho}{\rho_g} \cdot \frac{\Delta_{isub}}{\Delta_{ifg}} \quad (2)$$

where $A_c$: sectional area of the channel flow per fuel rod,
l: length of the heated channel portion,
$g_w$: heat flow flux of the wall of the heat conduction tube,
$V_{fi}$: flow velocity at the channel inlet,
$\rho_g$: steam density,
$\rho_f$: density of boiling water, $\Delta_{92}$ : $\Delta_f - \rho_g$,
$\Delta_{ifg}$: latent heat of evaporation, $\Delta_{isub}$: inlet subcooling,
$\xi_h$: peripheral length of the heated portion.

The approximate stability limit line for a large subcooling is given by the following equation.

$$N_{pck} \cdot eg - N_{sub} = \frac{2\left[K_i + \frac{f_m}{2D_h^*} + K_e\right]}{1 + \frac{1}{2}\left[\frac{f_m}{2D_h^*} + 2K_e\right]} \quad (3)$$

where $K_i$: inlet orifice coefficient,
$K_e$: outlet orifice coefficient,
$f_m$: friction coefficient of two-phase flow,
$D_h^*$: dimensionless hydraulic diameter $= Dh/l$ (Dh: hydraulic diameter).

In equation (3), the region in which the lefthand term is larger than the right-hand term represents an unstable region.

Figure 4:
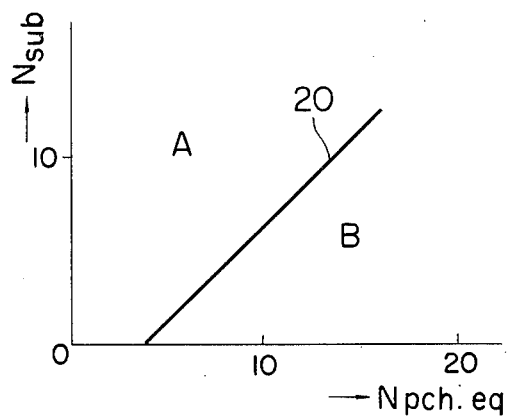
FIG. 4 is a graph for judging the stability by the method proposed by Ishii.

FIG. 4 is a graph showing the stability in a phase plane in which the ordinate represents the subcool number $N_{sub}$ and the abscissa the equilibrium phase change number $N_{pch.eq}$ Region A to the left of the stability limit border line 20 expressed by equation 3 shows stable state whereas region B on the opposite side unstable state. Regarding the detail of the graph reference is made to M. Ishii's paper "Thermally Induced Instabilities in Two-phase Mixtures in Thermal Equilibrium", PhD Thesis, School of Mechanical Engineering, Georgia Institute of Technology, Atlanta, Georgia, June, 1971.

Saha has proposed an approximate stability limit border line which holds even for smaller subcool numbers by expanding Ishii's equation for judging the stability as shown by the following paper.

P. Saha, M. Ishii and N. Zuber, "An Experimental Investigation of the Thermally Induced Flow Oscillation in Two-phase Systems" ASME Winter Annual Meeting, 1975.

Since the right-hand side of equation (3) is expressed in terms of the data of the hydrodynamic characteristic of each fuel channel, the stability can be judged by using measured values of the inlet flow velocity $V_{fi}$, inlet subcooling $\Delta_{isub}$, heat flux $g_w$ and the mean pressure which are the parameters for determining $N_{pck.eq}$ and $N_{sub}$ on the left-hand side. Furthermore, when a predetermined quantity is evaluated to hold equation 3, for example $V_{fi}*$ (that is at the stability limit border line) it is possible to qualitatively evaluate the stability by comparing the limit value $V_{fi}*$ and the present value $V_{fi}$ of the inlet flow velocity.

Figure 5:
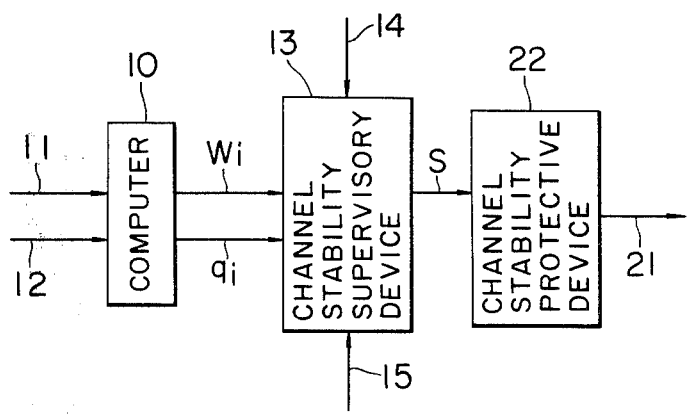
FIG. 5 is a block diagram showing a protective system in which control rods are locally inserted in accordance with this invention when the stability margin decreases.

As shown in FIG. 5 a channel stability protective device 22 is added to receive stability margin S produced by the channel stability supervisory device 13 for comparing the stability margin S with a predetermined reference value S*. When the stability margin is smaller than the reference value, an instruction for inserting control rods near the fuel channel is produced by the protective device 22. Thus, as the thermal power generated by a given channel decreases, the channel stability margin is recovered as can be noted from equation 3 thereby stabilizing the operation of the nuclear reactor.

It is well known that the computer 10 for calculating the core power distribution and the flow quantity distribution, and the channel stability supervisory device can be realized by programming in process computers.

The judgment of the stability can be made by any other method other than those described hereinabove without departing from the scope of this invention. For example, an decay ratio may be used as the stability allowance.

Since the actual operating condition of a nuclear reactor varies in a complicated manner, as the degree of the burning of the fuel, the insertion pattern of control rods, the reactor power and other parameters vary, when one tries to ensure a desired stability for all cases, the operating range would be limited. In contrast, according to this invention, since the stability of respective fuel channels are supervised in accordance with operating condition of the core it is possible to avoid excessively large stability margin and hence to widen the operating range, thereby enabling more flexible operation than is possible by the prior art method.

In addition, according to this invention, as it is possible to detect critical core regions having a small channel stability margin it is possible to increase the stability margin by changing the control rods pattern in such and nearby regions without decreasing the overall power of the reactor, this also contributing to the widening of the stable operating range.

Furthermore, according to this invention, when the stability allowance of any fuel channel decreases below a predetermined value it is possible to automatically recover the stability allowance by inserting rapidly or slowly a limited number of control rods near said fuel channel thereby preventing generation of channel instability which otherwise would result in scram of the reactor.

We claim:

1. In a boiling water reactor wherein a plurality of fuel assemblies constitute a reactor core and the fuel assemblies are cooled by a two-phase coolant flow which exhibits a density wave oscillation, a method of supervising the stability of said oscillation comprising the steps of determining a thermal power and a coolant flow quantity in each fuel assembly by signals produced by a plurality of in-core neutron flux detectors installed in said reactor core, and by signals regarding such operating conditions of said reactor core as inserted positions of control rods, a total flow quantity of the reactor core and the thermal power of the core determined by the heat balance of a nuclear power plant, judging the stability of said oscillation of each fuel assembly from said thermal power and the coolant flow quantity in said fuel assembly as well as from measured values of such parameters as inlet subcooling of the core and a pressure in a reactor vessel, or determining a stability limit of a selected one from said thermal power of the core or said total flow quantity of the reactor core or parameters described above, and comparing said stability limit with a measured value thereof so as to determine a stability margin.

2. The method according to claim 1, which further comprises the step of identifying a most unstable fuel assembly in said reactor core thereby facilitating the supervision of the whole core.

3. In a boiling water reactor wherein a plurality of fuel assemblies constitute a reactor core and the fuel assemblies are cooled by a two-phase coolant flow which exhibits a density wave oscillation, and a plurality of in-core neutron flux detectors are installed along the flow of said coolant, a method of superivsing the stability of said oscillation comprising the steps of determining a thermal power in each fuel assembly by signals produced by a plurality of said in-core neutron flux detectors, and by signals regarding operating conditions of the reactor, measuring a mutual correlation function of the output signals of said neutron flux detectors installed along the flow of said coolant so as to determine a propagation time of a disturbance in the coolant flow, determining the flow quantity of the coolant in each fuel assembly from said propagation time, judging the stability of said oscillation of each fuel assembly from said thermal power and said coolant flow quantity in said fuel assembly as well as from measured values of such parameters as inlet sub-cooling of the core and a pressure in a reactor vessel or determining a stability limit of a selected one from said thermal power of the core or said total flow quantity of the reactor core or said parameters, and comparing said stability limit with a measured value thereof so as to determine a stability margin.

4. The method according to claim 3, which further comprises the step of identifying a most unstable fuel assembly in said reactor core thereby facilitating the supervision of the whole core.

5. In a boiling water type nuclear reactor having a plurality of fuel channels forming a reactor core, each of said fuel channels being cooled by a quantity of coolant flowing through each channel, a method for supervising channel stability comprising:

determining the thermal power and coolant flow quantity in each of said channels from signals produced by a plurality of neutron flux detectors installed in said reactor core and the position of control rods in said reactor, the flow quantity of water through the reactor core, and the thermal power of the core as determined by the heat balance of the nuclear reactor; and judging the stability of an oscillation in a fuel channel from said thermal power and the coolant quantity in said fuel channel, and from the inlet sub-cooling of the core, the pressure in a reactor vessel or determining a stability limit of a selected fuel channel from the thermal power of the reactor core, or the total flow quantity of the reactor core or parameters including the inlet sub-cooling of the core, or the pressure in the reactor core and comparing said stability limit with a predetermined value thereof so as to determine a stability margin.

6. A method for supervising the channel stability in a reactor core of a nuclear reactor of the type wherein a plurality of fuel channels are provided having coolant flow therethrough comprising:

measuring the mutual correlation function of signals produced by neutron flux detectors installed along the flow of the coolant, whereby the propagation time of a disturbance in the coolant flow is determined;

determining the flow quantity of the coolant in each fuel channel from said propagation time; and judging the thermo-hydrodynamic stability of each fuel channel by the thermal power and said flow quantity and by such parameters as the core inlet sub-cooling and pressure in the reactor.

7. A method for supervising the channel stability in a reactor core of a nuclear reactor of the type wherein a plurality of fuel channels are provided having coolant flow therethrough comprising:

measuring the mutual corelation function of signals produced by neutron flux detectors installed along the flow of the coolant, whereby the propagation time of a disturbance in the coolant flow is determined;

determining the flow quantity of the coolant in each fuel channel from said propagation time;

determining a stability limit for a selected channel of the core from inlet sub-cooling, said flow quantity and pressure of a fuel channel; and comparing the stability limit with the stability represented by current values of said inlet sub-cooling, said flow quantity, and pressure of a fuel channel.

* * * * *